(12) United States Patent
Jacobs

(10) Patent No.: US 8,910,941 B2
(45) Date of Patent: Dec. 16, 2014

(54) PIVOTING ROLLER NIP STRUCTURE

(71) Applicant: Xerox Corporation, Norwalk, CT (US)

(72) Inventor: Jos Wim Jacobs, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 67 days.

(21) Appl. No.: 13/686,062

(22) Filed: Nov. 27, 2012

(65) Prior Publication Data

US 2014/0144755 A1    May 29, 2014

(51) Int. Cl.
*B65H 5/02*    (2006.01)
*B65G 13/02*    (2006.01)

(52) U.S. Cl.
CPC ..................................... *B65G 13/02* (2013.01)
USPC .......................................... 271/274; 271/272

(58) Field of Classification Search
CPC .................................. B65H 5/02; B65H 5/023
USPC ........... 271/228, 272, 273, 247; 198/780, 782
See application file for complete search history.

(56) References Cited

U.S. PATENT DOCUMENTS

| | | | | |
|---|---|---|---|---|
| 4,431,180 A * | 2/1984 | Nakajima | ...................... | 271/274 |
| 4,850,584 A * | 7/1989 | Watashi | ....................... | 271/274 |
| 4,919,318 A | 4/1990 | Wong | | |
| 4,990,003 A * | 2/1991 | Jingu et al. | ....................... | 400/56 |
| 5,044,624 A * | 9/1991 | Haus et al. | ..................... | 271/274 |
| 5,110,105 A * | 5/1992 | Nicoll et al. | ........................ | 271/5 |
| 5,344,058 A * | 9/1994 | Baffo | ............................. | 226/181 |
| 5,580,043 A * | 12/1996 | Gelb et al. | ..................... | 271/274 |
| 5,690,264 A | 11/1997 | Distefano et al. | | |
| 5,735,784 A * | 4/1998 | Ratzel | ................................ | 493/29 |
| 6,032,004 A | 2/2000 | Mirabella, Jr. et al. | | |
| 6,102,388 A * | 8/2000 | Thornhill | ...................... | 271/119 |
| 6,267,373 B1 * | 7/2001 | Takata | ............................ | 271/274 |
| 7,080,836 B2 * | 7/2006 | Hamada et al. | ................ | 271/274 |
| 7,242,895 B2 * | 7/2007 | Inada et al. | .................... | 399/328 |
| 7,828,292 B2 * | 11/2010 | Kitazawa | ....................... | 271/274 |
| 7,845,634 B2 * | 12/2010 | Asakawa et al. | ............... | 271/207 |
| 7,874,664 B2 | 1/2011 | Gervasi et al. | | |
| 7,900,919 B2 | 3/2011 | Ledgerwood et al. | | |
| 7,908,830 B2 | 3/2011 | Cousins et al. | | |
| 8,028,992 B2 * | 10/2011 | Terao | ............................ | 271/273 |
| 8,041,272 B2 * | 10/2011 | Nedelin | ......................... | 399/297 |
| 8,136,811 B1 | 3/2012 | Kuo et al. | | |
| 2005/0275160 A1 | 12/2005 | Reslow | | |
| 2006/0261540 A1 | 11/2006 | Loiselle et al. | | |
| 2006/0267271 A1 | 11/2006 | Mandel et al. | | |
| 2007/0045944 A1 | 3/2007 | Ban et al. | | |
| 2012/0091654 A1 | 4/2012 | Hagos et al. | | |

\* cited by examiner

*Primary Examiner* — Douglas Hess
(74) *Attorney, Agent, or Firm* — Gibb & Riley, LLC

(57) ABSTRACT

A roller nip assembly has a drive axle (with driver rollers) and a drive unit connected to a first end of the drive axle. The drive unit rotates the drive axle. In addition, a slotted mount is connected to a second end of the drive axle (opposite the first end). Additionally, an idler frame (with idler rollers) is positioned adjacent the drive axle. Further, a bias member is connected to the drive axle. The bias member moves the drive axle in the slotted mount to bias the drive rollers toward the idler rollers. The idler frame also includes a pivot structure. The bias member causes the drive axle to pivot. The pivot structure pivots the idler frame to compensate for the pivoting motion of the drive axle and to maintain pressure between the idler rollers and the drive rollers as the drive axle pivots.

20 Claims, 4 Drawing Sheets

PIVOTING ROLLER NIP STRUCTURE

BACKGROUND

Embodiments herein generally relate to media paths within devices that use nip rollers to move sheets or webs of media, and more particularly to a pivoting nip structure that can be used, for example, in the area where an opening panel exists to keep proper pressure on the media within the nip.

Most multi-function printers/multi-function devices (MFPs/MFDs) and related imaging devices, sometimes simply referred to as "printers" herein, use roller nips to move media throughout the machine. Typically, a nip uses a driven shaft with multiple rollers opposed by complementary idler rollers. The idler rollers are typically spring loaded to provide the nip load. The driven nip roller shaft is typically stationary due to drive system connections. Spring loaded idlers allow for tolerance variations in roller diameters and shaft placement and provide the nip clamping force so paper is fed without slippage. An issue occurs when one side of a "subsequent" transport roller set is mounted in the printer media feed path and the other to a panel or door that moves somehow (e.g., opens to an exterior sheet feeder). As media feed transfers from the pick roller to the subsequent roller set, the paper can become taut, exerting normal force against the door mounted idler rollers, which in turn causes the nip clamping force to be reduced or eliminated as the nip "opens". The nip opening does not need to be a fully open condition, the term "open" here indicates any nip gap that would cause a loss of traction. The result is poor feeding or a loss of feed motion. In the worst case, the customer experiences a paper jam.

SUMMARY

An exemplary printing device herein includes a panel of the exterior cover that opens to allow access to the interior of the printing device. A marking engine is within the interior of the printing device, and a media path moves media to and from the marking engine. The media path uses at least one roller nip assembly.

At least one of the roller nip assemblies has a drive axle and a drive unit operatively (meaning directly or indirectly) connected to one end (e.g., a "first" end) of the drive axle. The drive unit rotates the drive axle. In addition, a slotted mount (e.g., bushing) is operatively connected to a "second" end of the drive axle (the second end being opposite the first end). Further, one or more drive rollers are on and concentric/coaxial with the drive axle.

Additionally, an idler frame is connected to the panel and is positioned adjacent the drive axle. One or more idler rollers are operatively connected to the idler frame (either directly or through one or more idler axles). The idler rollers are positioned to contact the driver rollers. The idler rollers and the driver rollers form nips where the idler rollers contact the drive rollers to move the media through the device.

Further, a bias member (e.g., spring, bar, piston, actuator, etc.) is connected to the drive axle. The bias member moves the drive axle in the slotted bushing to bias the drive rollers toward the idler rollers. Thus, the first end of the drive axle is fixed and the second end of the drive axle is moveable, causing the drive axle to pivot around the distal portion of the first end of the drive axle. The idler frame comprises a pivot structure (e.g., pivot point) that allows the idler frame to pivot to compensate for the pivoting motion of the drive axle. Thus, the pivot structure of the idler frame pivots the idler frame as the drive axle pivots to maintain pressure between the idler rollers and the drive rollers.

The pivot structure (the pivot point of the idler structure) can be, for example, centered between the idler rollers. Also, the pivoting nature of the idler frame allows the drive rollers to potentially have different diameters. The idler frame can be connected to the panel or another interior or exterior structure.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, an issue occurs when one side of a subsequent transport roller set is mounted in the printer media feed path and the other to the panel or door that opens to an exterior sheet feeder. As media transfers from a pick roller to a subsequent roller set, the paper can become taut, exerting force against the door mounted idler rollers, which in turn can cause the nip clamping force to be reduced or eliminated as this force partially opens the nip. The structures herein address this nip opening problem and the resulting paper jams caused when feeding media from an external paper source into the printer feed path.

More specifically, with structures herein the door mounted idler set is fixed in place translationally but is allowed to pivot intermediate the rollers. The drive roller complement in the printer feed path allows small rotational motion on the driven end of the shaft while the opposite shaft end is constrained to allow only some translation toward the idler rollers. The non-driven end of the drive shaft is spring loaded within a slot to bias the drive rollers toward the idler rollers. When the door is closed, the pairs of rollers create a force loaded nip as they come together in a self aligning manner that accommodates angular offsets. In a system having components within normal tolerance variation, the resulting shaft angular offset when the drive shaft pivots is so slight that typical bushing clearance and drive connections tolerate the condition with no adverse effects.

Panels that open to a printer internal paper path often incorporate feed elements for an external paper source, such as a high capacity paper feeder or multi-sheet inserter. Drive rollers mounting inside the printer are preferred so that drive elements, such as a motor and drive belt or gear, can be mounted stationary and may even be part of a more extensive connected drive system. These considerations and others, such as available space and electrical connections generally dictate that the drive roller assembly be inside the printer and the idler rollers be mounted on the complementary door or panel, which then enables maintenance and jam access.

A retard roller has an internal feature that requires a large torque to drive the retard roller in the direction of the paper feed. This large retard torque keeps back a second sheet that might be fed in the feed nip by accident. The force to separate the two sheets is smaller than the force needed to drive the retard roller forwards. In other words, the retard roller prevents multi feeds. For example, a retard roller can prevent moving a sheet of paper below the sheet being fed into the printer paper path.

Figure 1:
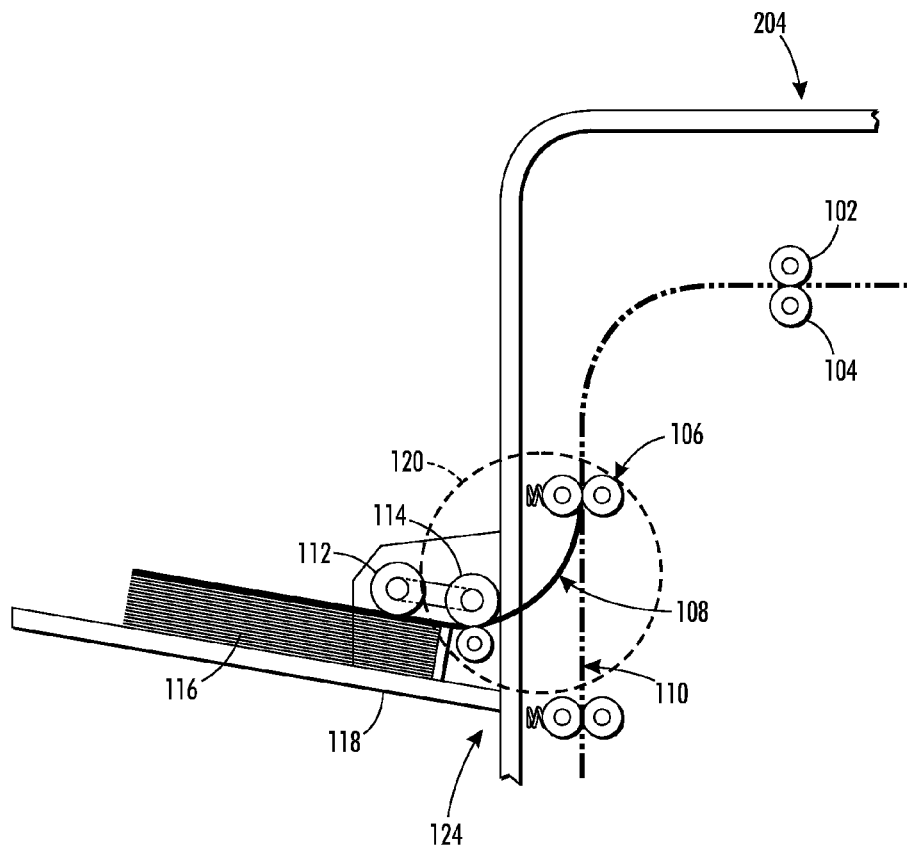
FIG. 1 is a side-view schematic diagram of a paper path.
Figure 2:
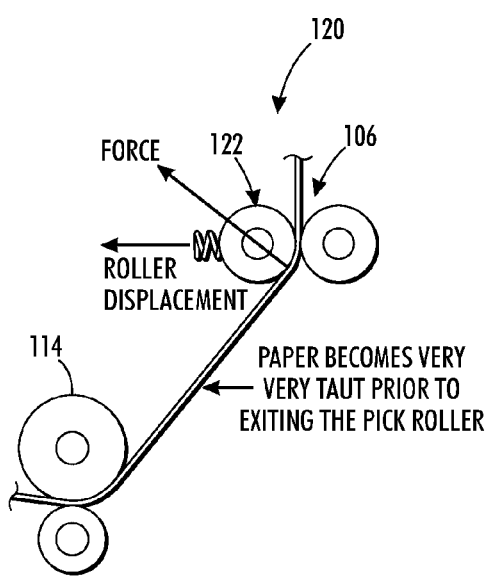
FIG. 2 is a side-view schematic diagram of a detail of FIG. 1.

FIGS. 1 and 2 show the general arrangement of an internal portion of a printing device 204, where the exterior panels are schematically shown as item 124 in the drawings. In FIGS. 1 and 2, each of the nips in the media path 110 includes a driver roller 104 and a biased (e.g., spring loaded) idler roller 102 (note that, for drawing clarity, not all drive and idler rollers are separately identified in the drawings and, in some instances a single identifier number is used to identify a drive/idler roller nip pair). On an external portion of the printing device (outside the exterior panels 124) a media tray 118 holds a stack of media 116 that is fed into the printing device 204 by various rollers and roller nips 112, 114 of a pick system. FIG. 2 illustrates the circle region 120 from FIG. 1 in greater detail.

While the pick system 112, 114 is feeding the sheet, there is nominally a buckle or non-taut slack condition 108 in the paper in the area between the pick rollers 114 and the subsequent transport roller set 106 (as shown in FIG. 1). When the media leaves the nudger roller 112, but is still captivated in the retard roller nip 114, transport rollers 106 ahead provide the feed function. At this point in transport progress, significant drag at the retard roller 114 can cause the media slackness to become taut, as shown in FIG. 2, encouraging the idler roller 122 of roller nip 106 to displace and open the nip 106 at the subsequent transport roller set, 106 which is solely providing the feed motion. When the subsequent drive roller set 106 is exposed to the drag force, the idlers 122 loose load force and allow slippage. Thus, the illustration inset 120 in FIG. 2 shows one condition of why the nip undesirably "opens".

As shown in FIGS. 3-6, an exemplary printing device herein includes a panel 124 of the exterior cover that opens to allow access to the interior of the printing device. A marking engine is within the interior of the printing device, and a media path moves media to and from the marking engine (see FIG. 7, below for more details on the marking engine, media path, and other items). The media path uses at least one roller nip assembly 100, such as that shown in FIGS. 3-6, at any appropriate location that could experience nip forces that undesirably open the nip.

More specifically, as shown in FIGS. 3-6, at least one of the roller nip assemblies 100 has a drive axle 146 (potentially within the interior of the printing device) and a drive unit 156 operatively (meaning directly or indirectly) connected to one end (e.g., a "first" end) of the drive axle 146. The drive unit 156 rotates the drive axle 146 and can comprise an individual motor, a driven gear or belt pulley, etc., operatively connected to a motor, etc. Further, one or more drive rollers 152 are on and concentric with the drive axle 146.

In addition, a slotted mount (e.g., bushing) 140 is operatively connected to a "second" end of the drive axle 146 (the second end being opposite the first end). This is distinguished from the non-slotted mount (e.g., bushing) 154 that holds the drive axle 146 in a relatively fixed position. The slotted mount 140 can comprise the structure illustrated in the drawings or any other structure that allows the drive shaft to axially rotate when driven by the drive unit, yet still allows the distal, non-driven end of the drive axle 146 to move toward and away from the connecting structure 124 (e.g., exterior panels) so that the distal, non-driven end of the drive axle 146 can pivot around the driven end of the drive axle 146. Thus, the first end of the drive axle 146 is fixed (although there is some flex in the non-slotted bushing 154 and in the drive axle 146 itself) and the second end of the drive axle 146 is moveable to allow the drive axle 146 to pivot somewhat around (or about) the distal portion of the first end of the drive axle 146.

Additionally, an idler frame 144 is positioned adjacent the drive axle 146. The idler frame 144 can be connected to the exterior panel 124 or another interior or exterior structure (all of which are schematically represented by the dashed line 124 for drawing simplification). One or more idler rollers 150 are operatively connected to the idler frame 144 (either directly or through one or more idler axles). The idler rollers 150 are positioned to contact the driver rollers 152. The idler rollers 150 and the driver rollers 152 form nips where the idler rollers 150 contact the drive rollers 152 to move the media through the device.

Further, a bias member 142 (of any form, e.g., spring, bar, piston, actuator, etc.) is connected to the drive axle 146. The bias member 142 moves the drive axle 146 in the slotted bushing 140. This structure can also be a bushing that itself fits in a slot in a frame, where the shaft fits in a non-slotted hole in the bushing, but the whole bushing can move in the slot in the frame. Such structures bias the drive rollers 152 toward the idler rollers 150. While the bias member 142 is shown at the second end of the drive axle 146, it could be located at any location along the drive axle 146. Thus, the spring loading can be applied at any practical location along the shaft 146 or at the non-drive end 140 so long as the bias force has the ability to pivot the drive axle as shown.

The idler frame 144 comprises a pivot structure 148 (e.g., pivot point) that allows the idler frame 144 to pivot to compensate for the pivoting motion of the drive axle 146. The pivot structure 148 can comprise any appropriate structure (e.g., a bushing, a cylinder structure (pin, screw, rivet, shaft, etc.), washers, etc.) to keep the idler frame 144 fixed in horizontal and lateral position, yet allowing the idler frame 144 to pivot around (or about) the pivot structure 148 (to pivot in the same plane that the drive axle 146 pivots). Thus, the pivot structure 148 of the idler frame 144 pivots the idler frame 144 as the drive axle 146 pivots to maintain pressure between the idler rollers 150 and the drive rollers 152.

The pivot structure 148 (the pivot point of the idler frame 144) can be, for example, centered between the idler rollers 150 or the pivot structure could be located closer to one of the idler rollers 150, depending upon the amount of pivot needed, the availability of mounting points within the printing device, etc. Some structures will need to keep the pivot centered because this balances the nip force between the two nips. The speed of the media in the nip depends on the pressure in the nip. Further, as used herein, the term "rotation" of the drive shaft 146 is the movement caused by the drive unit 156, where the drive shaft 146 rotates around the axle center to cause the rollers 152 to rotate; while the term "pivot" is used to describe the movement of the second end (near area 140) of the drive shaft 146 around (or about) the fixed location of the first end (near area 156) of the drive shaft 146. Again, the drive shaft 146 and the idler frame 144 pivot in the same plane.

Figure 3:
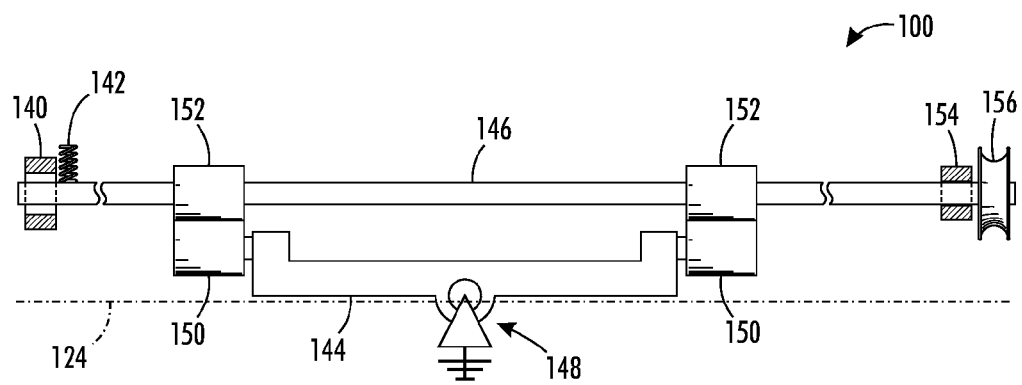
FIG. 3 is a top-view schematic diagram of a device according to embodiments herein.
Figure 4:
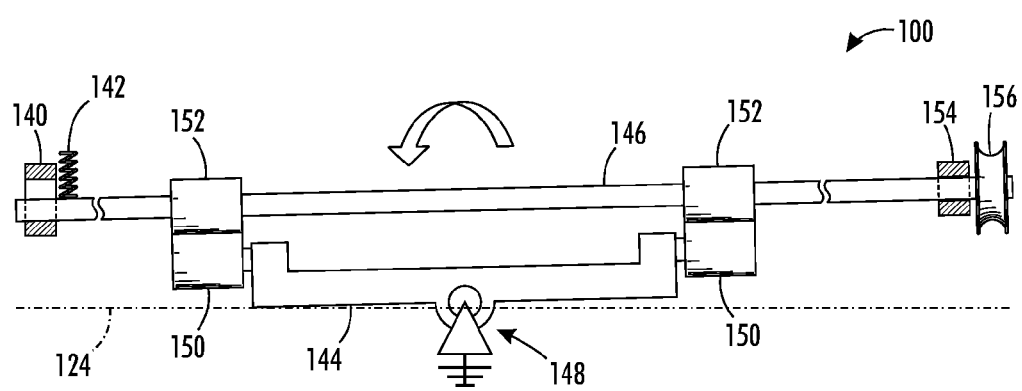
FIG. 4 is a top-view schematic diagram of a device according to embodiments herein.
Figure 5:
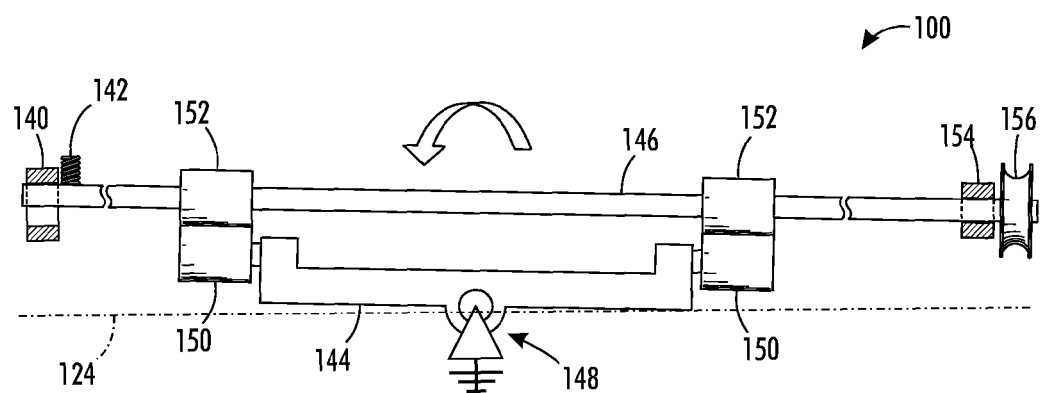
FIG. 5 is a top-view schematic diagram of a device according to embodiments herein.
Figure 6:
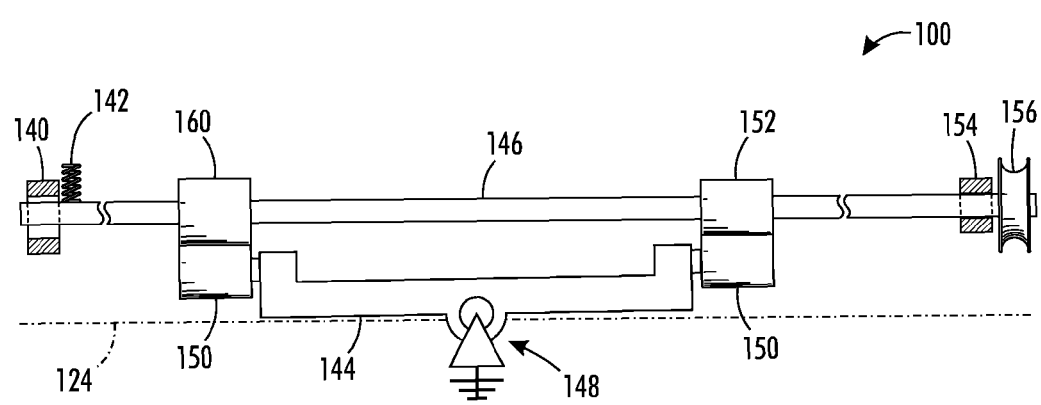
FIG. 6 is a top-view schematic diagram of a device according to embodiments herein.

Thus, FIG. 3 illustrates a balanced (unpivoted) situation where neither the drive axle 146 nor the idler structure 144 are pivoted (relative to the connecting structure 124). Thus, in FIG. 3, the drive axle 146, the idler structure 144 (or at least the axles of the idler rollers 150), and the connecting structure 124 are parallel to each other. In contrast, FIGS. 4 and 5 illustrate situations where the drive axle 146 and the idler structure 144 are pivoted (relative to the connecting structure 124) depending upon forces acting against, or forces produced by, the bias member 142. Thus, in FIGS. 4 and 5, the drive axle 146 and the idler structure 144 (or at least the axles of the idler rollers 150) and are parallel to each other, but are not parallel to the connecting structure 124. Note that the angle offsets (amount of pivoting) shown in the drawings may be exaggerated to aid in visualization of the movement of the illustrated structures. With such an angular offset, the pressure between the nips is maintained at a required force to ensure drive traction. Also, the pivoting nature of the idler frame 144 allows one or more of the rollers to potentially have different diameters, as shown by oversized roller 160 (having a size relatively larger than other rollers) in FIG. 6. Thus, angular offsets can be caused by or exacerbated by roller diameter variations.

Thus, as shown above, with the structures disclosed herein, the idler roller assembly 144 mounted in the door/panel 124 is fixed in place but is allowed to pivot in the plane formed by the idler and drive roller centers; and the drive shaft 146 for the drive rollers 152 has travel range in that plane at the end 140 opposite the drive connection 156. At the drive end 156 of the drive axle 146, the shaft 146 is constrained in place, with some clearance that allows small angular displacement of the drive shaft 146. The structures herein spring load 142 the drive shaft 146 so that it pivots and moves the drive rollers 152 into forceful contact with idler rollers 150 to ensure sufficient traction for media transport.

System tolerances are accounted for in order to establish beneficial nominal bias in alignment of the drive shaft 146 and to minimize angular offsets from the nominal paper transport plane. Size and position variation produces expected angular offset (pivoting) of the drive shaft 146. A number of factors contribute to the pivoting of the drive shaft 146. The resulting paper transport effectiveness is not adversely affected by these angular offsets. Any combination of positional tolerance and/or size variation can be accommodated, provided there is sufficient travel available at the non-drive end 140 of the transport drive shaft 146.

Figure 7:
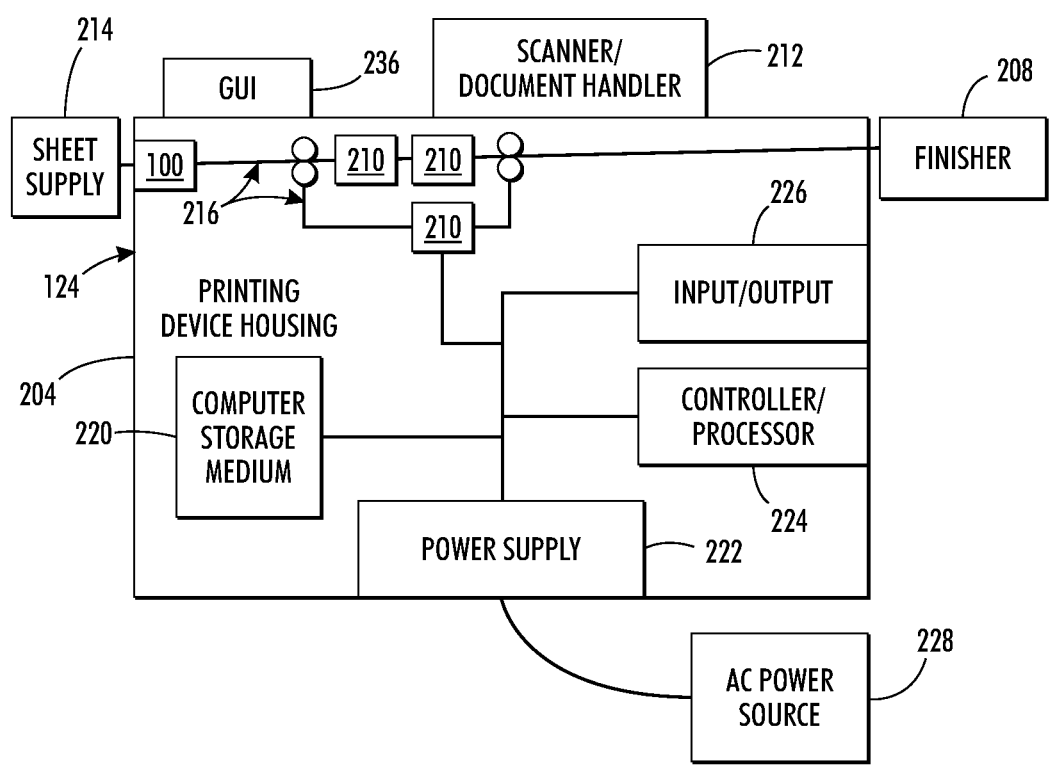
FIG. 7 is a side-view schematic diagram of a device according to embodiments herein.

FIG. 7 illustrates a computerized device that is a printing device 204, which can be used with embodiments herein and can comprise, for example, a printer, copier, multi-function machine, multi-function device (MFD), etc. The printing device 204 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing (made up of one or more exterior panels 124) has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

The printing device 204 also includes at least one marking device (printing engines) 210 operatively connected to the processor 224, a media path 216 (that includes one or more roller nip assembly 100 discussed herein) positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

As would be understood by those ordinarily skilled in the art, the printing device 10 shown in FIG. 7 is only one example and the embodiments herein are equally applicable to other types of printing devices that may include fewer components or more components. For example, while a limited number of printing engines and paper paths are illustrated in FIG. 7, those ordinarily skilled in the art would understand that many more paper paths and additional printing engines could be included within any printing device used with embodiments herein.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A roller nip assembly comprising:
    a drive axle;
    a slotted mount operatively connected to an end of said drive axle;
    drive rollers on and concentric with said drive axle;
    an idler frame positioned adjacent said drive axle;
    idler rollers operatively connected to said idler frame, said idler rollers being positioned to contact said drive rollers; and
    a bias member connected to said drive axle,
    said bias member moving said drive axle in said slotted mount to bias said drive rollers toward said idler rollers,
    said idler frame comprising a pivot structure,
    said bias member causing said drive axle to pivot, and
    said pivot structure pivoting said idler frame to maintain pressure between said idler rollers and said drive rollers as said drive axle pivots.

2. The roller nip assembly according to claim 1, said drive rollers having different diameters.

3. The roller nip assembly according to claim 1, said pivot structure being centered between said idler rollers.

4. The roller nip assembly according to claim 1, a first end of said drive axle being fixed and a second end of said drive axle being moveable.

5. The roller nip assembly according to claim 1, said idler rollers and said drive rollers forming nips where said idler rollers contact said drive rollers.

6. A roller nip assembly comprising:
    a drive axle;
    a drive unit operatively connected to a first end of said drive axle, said drive unit rotating said drive axle;
    a slotted bushing operatively connected to a second end of said drive axle opposite said first end;
    drive rollers on and concentric with said drive axle;
    an idler frame positioned adjacent said drive axle;
    idler rollers operatively connected to said idler frame, said idler rollers being positioned to contact said drive rollers; and
    a bias member connected to said drive axle,
    said bias member moving said drive axle in said slotted bushing to bias said drive rollers toward said idler rollers,
    said idler frame comprising a pivot structure,
    said bias member causing said drive axle to pivot around said first end, and
    said pivot structure pivoting said idler frame to maintain pressure between said idler rollers and said drive rollers as said drive axle pivots.

7. The roller nip assembly according to claim 6, said drive rollers having different diameters.

8. The roller nip assembly according to claim 6, said pivot structure being centered between said idler rollers.

9. The roller nip assembly according to claim 6, said first end of said drive axle being fixed and said second end of said drive axle being moveable.

10. The roller nip assembly according to claim 6, said idler rollers and said drive rollers forming nips where said idler rollers contact said drive rollers.

11. A printing device comprising:
    a marking engine;
    a media path moving media to and from said marking engine, said media path comprising a roller nip assembly comprising:
        a drive axle;
        a drive unit operatively connected to a first end of said drive axle, said drive unit rotating said drive axle;
        a slotted bushing operatively connected to a second end of said drive axle opposite said first end;
        drive rollers on and concentric with said drive axle;
        an idler frame positioned adjacent said drive axle;
        idler rollers operatively connected to said idler frame, said idler rollers being positioned to contact said drive rollers; and
        a bias member connected to said drive axle,
    said bias member moving said drive axle in said slotted bushing to bias said drive rollers toward said idler rollers,
    said idler frame comprising a pivot structure,
    said bias member causing said drive axle to pivot around said first end, and
    said pivot structure pivoting said idler frame to maintain pressure between said idler rollers and said drive rollers as said drive axle pivots.

12. The roller nip assembly according to claim 11, said drive rollers having different diameters.

13. The roller nip assembly according to claim 11, said pivot structure being centered between said idler rollers.

14. The roller nip assembly according to claim 11, said first end of said drive axle being fixed and said second end of said drive axle being moveable.

15. The roller nip assembly according to claim 11, said idler rollers and said drive rollers forming nips where said idler rollers contact said drive rollers.

16. A printing device comprising:
    an exterior cover comprising a panel, said panel opening to allow access to an interior of said printing device;
    a marking engine within said interior of said printing device;
    a media path moving media to and from said marking engine, said media path comprising a roller nip assembly comprising:
        a drive axle within said interior of said printing device;
        a drive unit operatively connected to a first end of said drive axle, said drive unit rotating said drive axle;
        a slotted bushing operatively connected to a second end of said drive axle opposite said first end;
        drive rollers on and concentric with said drive axle;
        an idler frame connected to said panel and being positioned adjacent said drive axle;
        idler rollers operatively connected to said idler frame, said idler rollers being positioned to contact said drive rollers; and
        a bias member connected to said drive axle,
    said bias member moving said drive axle in said slotted bushing to bias said drive rollers toward said idler rollers,
    said idler frame comprising a pivot structure connected to said panel,
    said bias member causing said drive axle to pivot around said first end, and
    said pivot structure pivoting said idler frame to maintain pressure between said idler rollers and said drive rollers as said drive axle pivots.

17. The roller nip assembly according to claim 16, said drive rollers having different diameters.

18. The roller nip assembly according to claim 16, said pivot structure being centered between said idler rollers.

19. The roller nip assembly according to claim 16, said first end of said drive axle being fixed and said second end of said drive axle being moveable.

20. The roller nip assembly according to claim 16, said idler rollers and said drive rollers forming nips where said idler rollers contact said drive rollers.

* * * * *